Nov. 1, 1955  C. F. FALKENBERG  2,722,281
SHIFTABLY MOUNTED TRANSMISSION ASSEMBLY
Filed Aug. 16, 1954  2 Sheets-Sheet 1
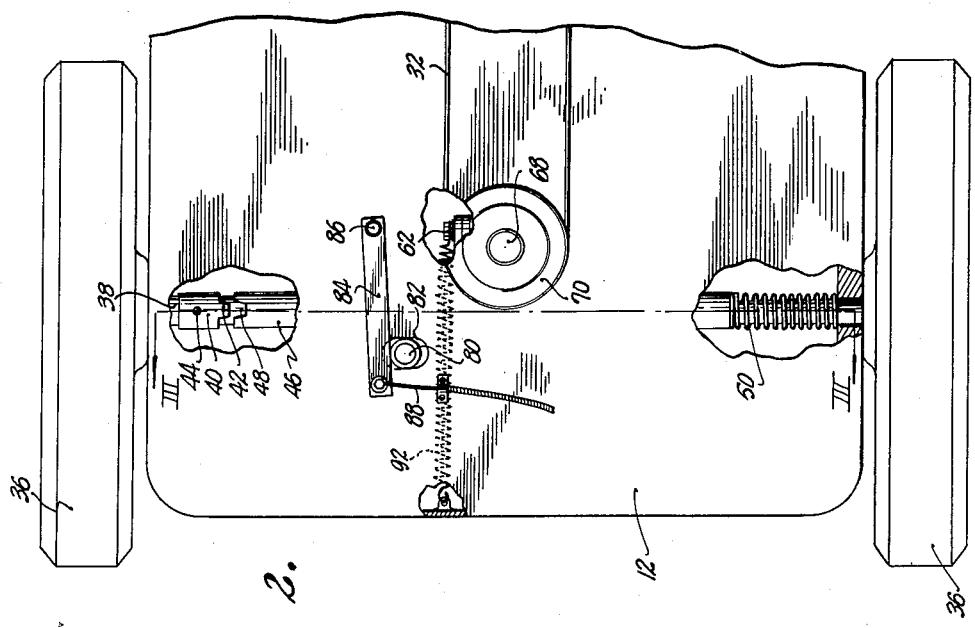
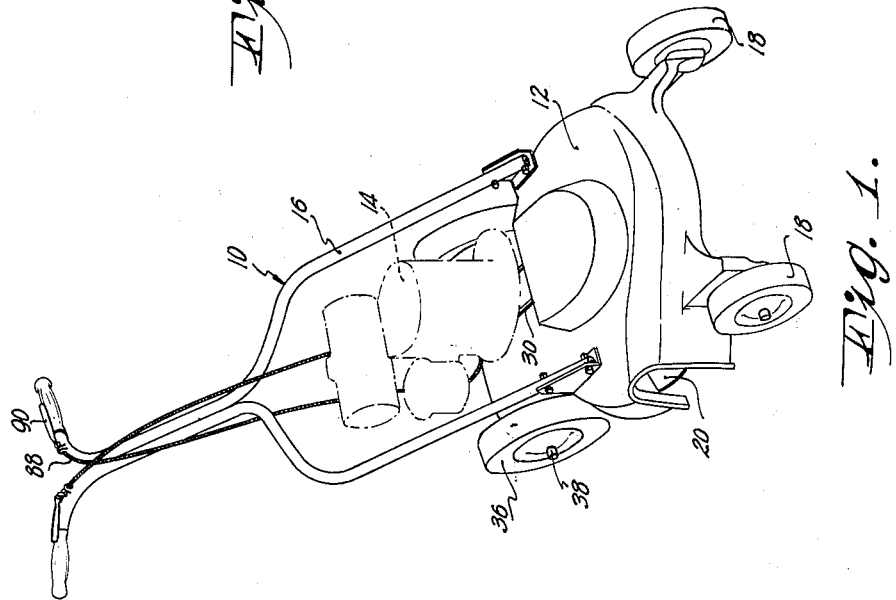
INVENTOR.
Charles F. Falkenberg
BY
ATTORNEY.

Nov. 1, 1955  C. F. FALKENBERG  2,722,281

SHIFTABLY MOUNTED TRANSMISSION ASSEMBLY

Filed Aug. 16, 1954  2 Sheets—Sheet 2

INVENTOR.
Charles F. Falkenberg
BY
ATTORNEY.

United States Patent Office 2,722,281
Patented Nov. 1, 1955

2,722,281

SHIFTABLY MOUNTED TRANSMISSION ASSEMBLY

Charles F. Falkenberg, Kansas City, Mo.

Application August 16, 1954, Serial No. 449,967

1 Claim. (Cl. 180—19)

This invention relates to self-propelled, rotary lawnmowers and particularly to a novel assembly of parts for transmitting rotative motion from the prime mover to the driven axle.

The most important object of the present invention is to provide a transmission assembly for power lawnmowers which assembly is mounted on the driven axle for shifting movement relative thereto and to the lawnmower itself.

Another important object of the present invention is the provision of clutch means on the axle which interconnects the transmission assembly and the driven axle of the lawnmower when the transmission is shifted in one direction.

A further important object of the present invention is to provide control apparatus on the lawnmower for shifting the transmission in the opposite direction to disengage the above mentioned clutch.

With these and other objects in view, the novel transmission assembly of the present invention comprises, generally, a clutch element rigidly attached to the driven axle of a power lawnmower; a tubular element which is both rotatable and shiftable on the axle into and out of clutching engagement with the clutch element; a transmission assembly mounted on the tubular element for shifting movement therewith, the tubular element being rotatable with respect to the axle when the elements are disengaged and adapted to drive the axle when the elements are engaged.

Other objectives of the present invention include the provision of yieldable means on the driven axle for holding the above mentioned elements normally engaged; a spring interconnecting the transmission assembly and the body of the lawnmower for counterbalancing the torque on the assembly when the elements are engaged; and many more minor objects which will become apparent from a study of the following specification and the appended drawings, wherein:

Figure 1 is a perspective view of a conventional, rotary lawnmower with which the shiftable transmission assembly of the present invention is adapted for use.

Fig. 2 is an enlarged, fragmentary, plan view of the lawnmower shown in Fig. 1, parts being broken away and in section to reveal details of construction.

Figure 5:
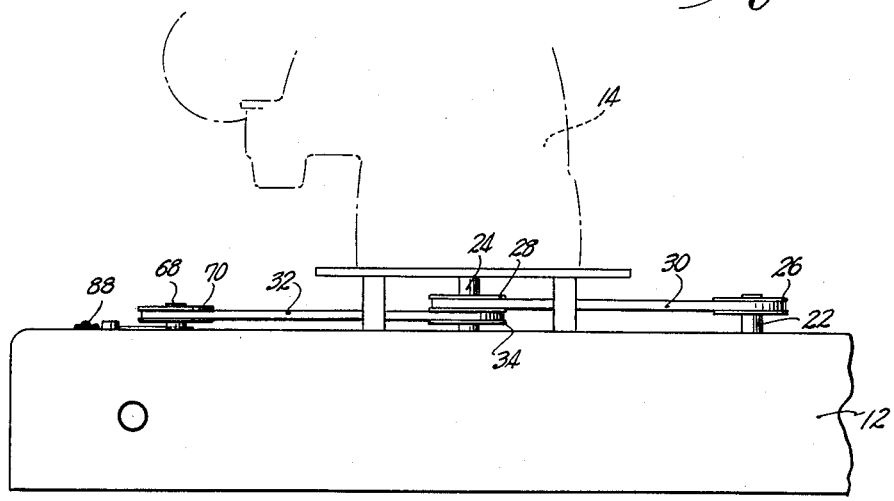
Fig. 5 is an enlarged, fragmentary, side elevational view of the lawnmower illustrated in Fig. 1.

Referring now to the drawings, there is shown, in Fig. 1, a conventional, rotary lawnmower 10 having a body 12 which is cast from aluminum or other suitable material. Lawnmower 10 also includes, as elements thereof, a prime mover 14, a handle 16, front wheels 18, and a rotary blade 20. As best shown in Fig. 5, rotary blade 20 is mounted on a shaft 22, which is directly coupled with a drive shaft 24 of prime mover 14 by means of pulleys 26—28 and belt 30. A second belt 32 extends rearwardly from a pulley 34 mounted on shaft 24 between pulley 28.

Figure 3:
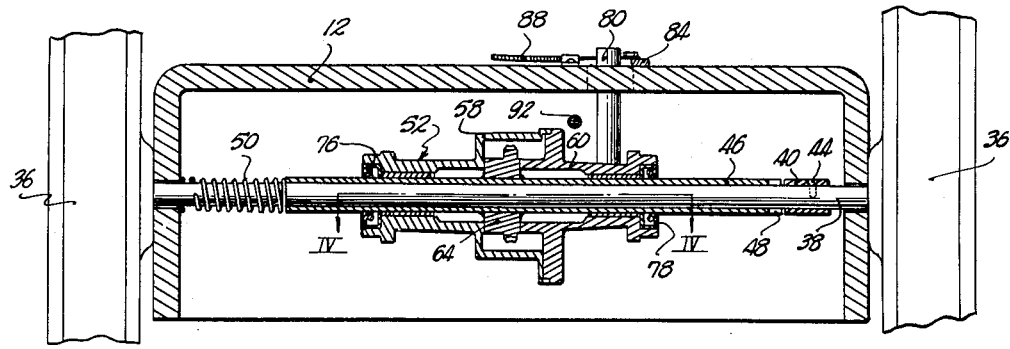
Fig. 3 is a sectional view, taken on lines III—III of Fig. 2.
Figure 4:
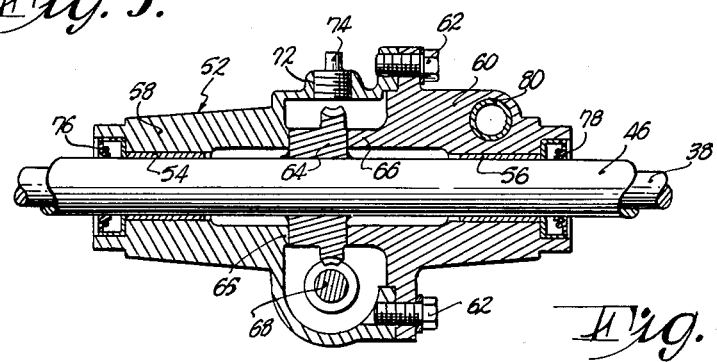
Fig. 4 is an enlarged, cross sectional view, taken on lines IV—IV of Fig. 3.

The subject matter of the present invention is best illustrated in Figs. 2–4 inclusive. A pair of rear wheels 36 is mounted on an axle 38 for rotation therewith. A tubular clutch element 40, having lugs 42 thereon, is rigidly attached to axle 38 by fasteners 44. An elongated, tubular sleeve 46, having a cavity 48 at one end thereof for each of the lugs 42, is both rotatable and reciprocable on axle 38. The coil spring 50 on axle 38 bears against the opposite end of sleeve 46, to hold the lugs 42 and the cavities 48 in normal, clutching interengagement.

The transmission assembly, per se, has a housing broadly designated by the numeral 52 (Figs. 3 and 4) which housing 52 rotatably receives sleeve 46 within bearings 54 and 56. As best shown in Fig. 4, the housing 52 includes sections 58 and 60, which are interconnected by means of fasteners 62. A gear wheel 64 is rigidly mounted on sleeve 46, within housing 52. Internal, annular portions 65 and 66, of sections 58 and 60 respectively, provide bearing surfaces for gear 64 within housing 52, in such a manner that housing 52 and sleeve 46 reciprocate as a unit on axle 38. A worm shaft 68, which works with the gear 64 to rotate the latter and sleeve 46, is journalled in section 58 of housing 52, and extends upwardly therefrom, through a transverse slot (not shown) in body 12. At its uppermost end, above body 12, worm shaft 68 carries a pulley 70 which, in turn, receives the belt 32.

An opening 72 is provided in housing 52 for the admission of lubricating oil therein, which opening 72 threadably receives a plug 74. Oil seals 76—78, at each end, respectively, of housing 52, prevent the escape of lubricating oil from the housing 52.

As previously mentioned, sleeve 46 and housing 52 are reciprocable as a unit on axle 38. For this purpose, section 60 of housing 52 is provided with an opening which threadably receives an upstanding post 80. Post 80 extends upwardly through a transverse slot 82 in body 12, similar to the slot provided for worm shaft 68. The means for shifting post 80 within slot 82, against the bias of spring 50, includes a lever 84 which is swingable on the body 12 about pivot pin 86. At its opposite end, lever 84 receives one end of a flexible shaft 88 which, at its other end is attached to a lever 90 on handle 16 of lawnmower 10. Thus, upon actuation of lever 90, lever 84 shifts post 80 within slot 82 to disengage sleeve 46 and element 40.

A tension spring 92 (Fig. 2) is attached at one end thereof to one of the fasteners 62 and at its opposite end to body 12, beneath the latter. Spring 92 serves to counterbalance the torque imparted to housing 52 when sleeve 46 and element 40 are in the normally engaged position. Rotation of housing 52 relative to sleeve 46 is further limited by the engagement of post 80 with the sides of slot 82 and by the engagement of worm shaft 68 with the sides of the slot provided therefor.

In operation, lugs 42 of element 40 normally extend into cavities 48 of sleeve 46, so that wheels 36 and axle 38 are driven as worm shaft 68 is rotated by belt 32. When it is desired to disengage element 40 and sleeve 46, for example, when making a turn, the operator need only actuate lever 90 to swing lever 84, thereby shifting post 80, housing 52 and sleeve 46 against the bias of spring 50.

Referring now to Fig. 5 of the drawing, it is seen that, when the shaft 24 of prime mover 14 rotates, pulleys 28 and 34 also rotate. Belt 30 drives the shaft 22 for blade 20, and belt 32 drives worm shaft 68 and sleeve 46. Viewing Fig. 2, it is obvious that, when element 40 and sleeve 46 are disengaged, worm shaft 68 will rotate gear 64 and sleeve 46 relative to axle 38 and housing 52.

The principal advantage of the present invention is the ease with which an entire self-propelled, rotary lawnmower 10 is initially assembled. Heretofore, it has been necessary to rigidly mount the housing 52 on the body 12, as well as on the axle 38. Since the bodies 12 are not precision castings, the elimination of binding within the transmission assembly often necessitates time-consuming, trial and error adjustments when the housing 52 is mounted on body 12. Furthermore, such a construction calls for the use of a relatively expensive clutch apparatus. The shiftable transmission assembly of the present invention, therefore, avoids these and other difficulties, in addition to presenting a lawnmower 10 which is easily assembled, durable and positive in operation.

It is obvious that the embodiment of the present invention herein disclosed is a preferred form only and that many changes or modifications may be made therein without departing from the broad principles of the present invention. Such changes or modifications are contemplated hereby and it is, therefore, desired to be limited only by the scope of the appended claim.

Having thus described the invention, what is claimed as new and desired to be secured by Letters Patent is:

In a power lawnmower having a body and a prime mover and a rotatable, driven, wheel-carrying axle on the body, a clutch element rigidly mounted on the axle for rotation therewith; an elongated, tubular sleeve shiftably mounted on the axle for rotation and reciprocation relative to the latter; clutch parts on one end of the sleeve adapted for operative engagement with said element when the sleeve is reciprocated to one end of its path of travel; a spring on the axle bearing against the other end of the sleeve for normally maintaining the latter at said one end of its path of travel; a pinion gear rigidly mounted on the sleeve intermediate the ends of the latter for rotation therewith; a housing rotatably mounted on the sleeve in covering relationship to the pinion gear, said housing having opposed bearing surfaces engageable with opposite sides of the pinion gear for reciprocation of the pinion gear and sleeve relative to the axle when the housing is shifted axially along the axle; a worm gear rotatably mounted in the housing and in operative engagement with the pinion gear; means adapted for operably coupling the prime mover with the worm gear regardless of the reciprocated position of the housing relative to the axle; and control apparatus on the body and operably coupled with the housing for shifting the latter along the axle against the action of said spring in a direction to move the sleeve away from said one end of its path of travel, whereby said parts may be disengaged from said element.

References Cited in the file of this patent
UNITED STATES PATENTS

| | | |
|---|---|---|
| 1,064,365 | Munsing | June 10, 1913 |
| 1,462,016 | Lewis | July 17, 1923 |
| 1,869,746 | Hoke | Aug. 2, 1932 |
| 2,535,615 | Van Ausdall | Dec. 26, 1950 |